March 22, 1966     D. L. BOWERS     3,241,869
REPLACEMENT HANDLE FOR VALVE STEMS AND THE LIKE
Filed June 13, 1963     2 Sheets-Sheet 1
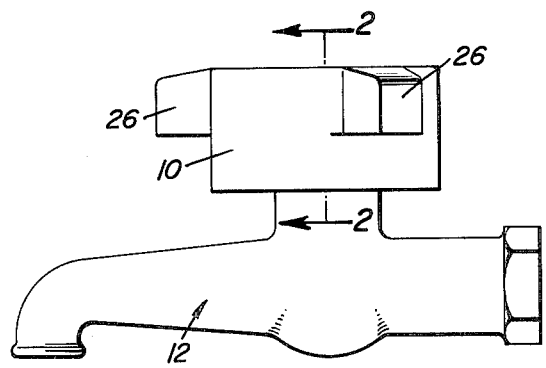
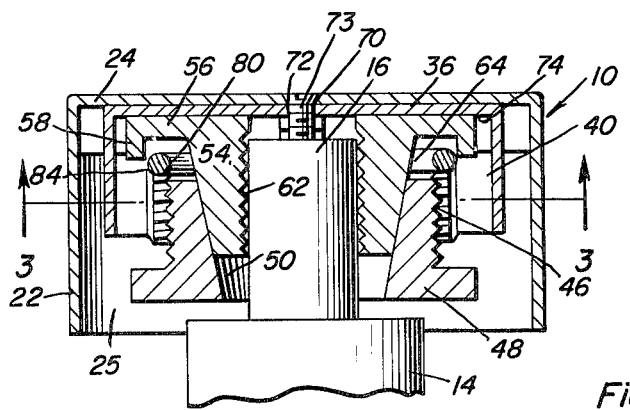
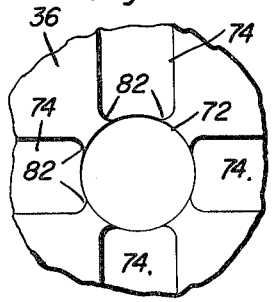
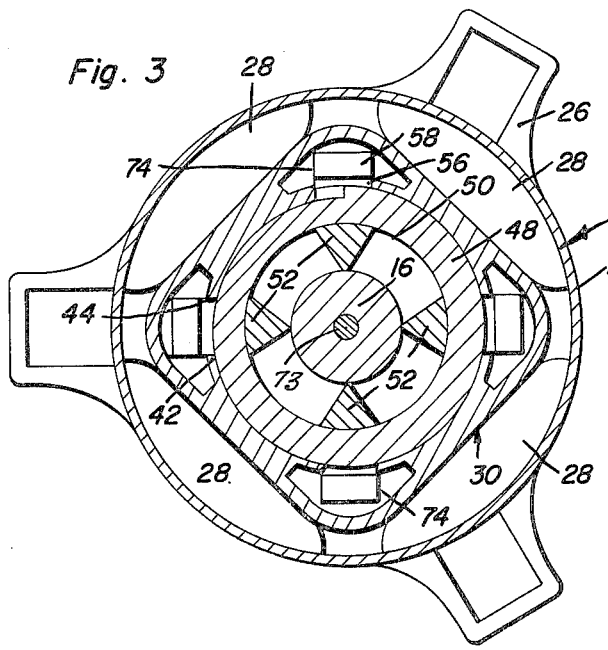
Donald L. Bowers
INVENTOR.
BY *Clarence A. O'Brien*
*and Harvey B. Jackson*
Attorneys March 22, 1966     D. L. BOWERS     3,241,869
REPLACEMENT HANDLE FOR VALVE STEMS AND THE LIKE
Filed June 13, 1963     2 Sheets-Sheet 2
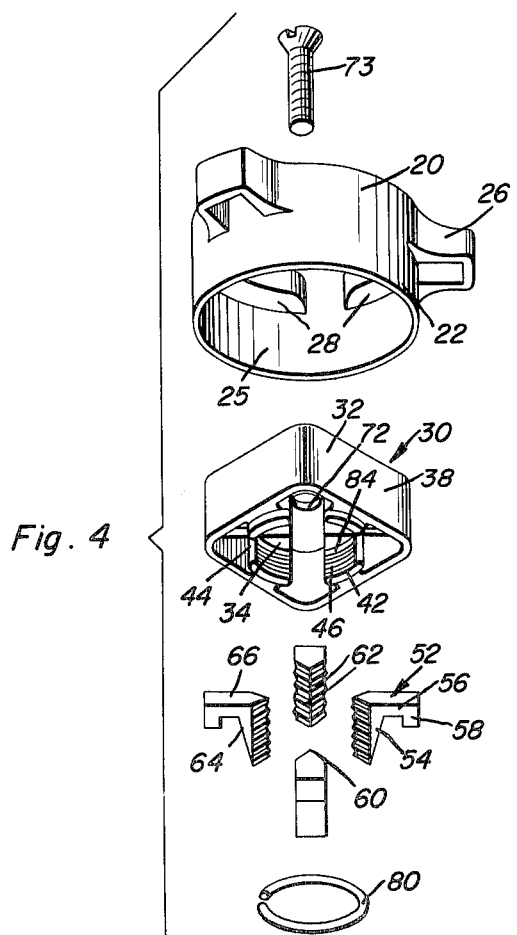
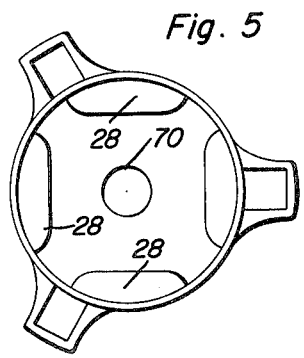
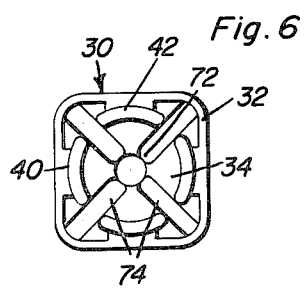
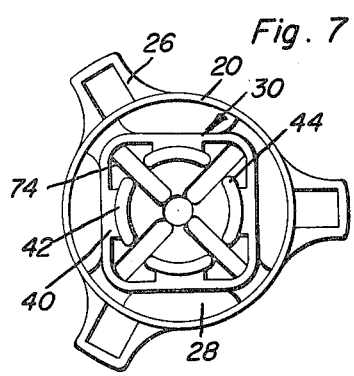
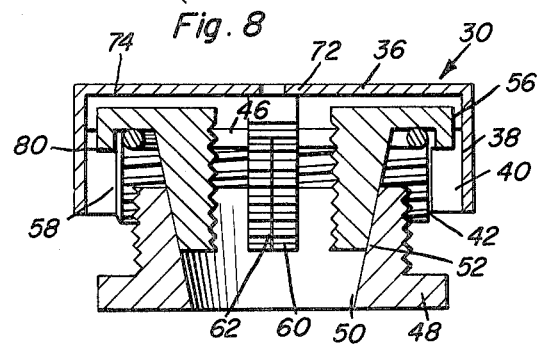
Donald L. Bowers
INVENTOR.

United States Patent Office 3,241,869
Patented Mar. 22, 1966

3,241,869
REPLACEMENT HANDLE FOR VALVE
STEMS AND THE LIKE
Donald L. Bowers, Toledo, Ohio, assignor to Bowers
Manufacturing Co., Division of Sunroc Great Lakes
Company
Filed June 13, 1963, Ser. No. 287,688
2 Claims. (Cl. 287—53)

This invention comprises a novel and useful replacement handle for valve stems and the like and more particularly pertains to a universal handle adapted to be detachably engaged and secured to a variety of different sizes of stems or shafts for purpose of imparting rotion to the latter and whereby a simple but highly effective gripping action is obtained between the replacement handle unit and the shaft or stem to which the same is to be connected.

It has been known heretofore to provide replaceable or universal handles applicable to different diameters of valve stems and the like for the purpose of providing a handgrip to permit rotation of such shafts. One such prior invention is that of Oscar Manning et al. Patent No. 2,797,941, issued July 2, 1957 and for which the present invention constitutes an improvement.

It is the primary object of this invention to provide a universal replacement handle adapted for use with valve stems, shafts and other similar members to which a controlled rotation is to be imparted and wherein a handle body has removable seated therein an attachment insert which latter contains a series of gripping elements together with actuating means therefor by which the insert and thus the handle in which the insert is mounted may be removably but securely engaged upon valve stems, shafts and the like of different diameters.

A further object of the invention is to provide a replacement handle assembly in accordance with the preceding object wherein a single handle body may interchangeably receive a plurality of attachment inserts having different capacities and different types of locking engagement with a shaft or stem to be engaged thereby.

Yet another purpose of the invention is to provide a replacement handle in accordance with the foregoing objects wherein an adapter insert shall comprise a subassembly containing a series of jaws or gripping elements together with an actuating means therefor and by which the elements are retained in a proper position and are moved into locking engagement.

A still further object of the invention is to provide a replacement handle assembly in accordance with the preceding objects wherein a single fastening means is utilized for the combined purposes of securing an adapter insert in the replacement handle body and for securing both the handle body and the adapter insert to the end of a shaft to which the handle is to be locked.

Yet another object of the invention is to provide a replacement handle assembly in accordance with the above set forth objects wherein an actuating member in the form of a bushing having a conical internal wedging surface embracingly receives the tapering exterior surfaces of plurality of gripping elements each in the form of a J-shaped member and which elements include retaining means preventing their accidental separation from the actuating bushing when the device is disengaged from a stem or shaft and when the attachment insert is to be inserted into or removed from the handle body.

A further and more specific object of the invention is to provide a device in accordance with the immediately preceding object wherein novel guide means are provided within the attachment insert for confining the gripping elements to a radial movement towards and from the center of the stem or shaft to which the device is to be attached together with other guide means formed within the handle body for non-rotatably seating therein the attachment insert.

An additional object of the invention is to provide a device as set forth in the preceding objects and which shall include therein retaining and limit means for preventing removal of the gripping elements from the attachment insert body and also will limit radially inward sliding movement of the gripping elements.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view showing a faucet to which a preferred embodiment of a universally applicable replacement handle in accordance with this invention has been applied;

FIGURE 2 is an enlarged view in vertical transverse section taken substantially upon the plane indicated by the section line 2—2 of FIGURE 1 and showing the manner in which the replacement handle assembly of this invention is applied to the stem of a faucet valve;

FIGURE 3 is a horizontal sectional view taken substantially upon the plane indicated by the section line 3—3 of FIGURE 2 and showing the disposition of certain of the guide means of this invention;

FIGURE 4 is an exploded perspective view of the various components which make up the replacement handle assembly of the invention;

FIGURE 5 is a bottom plan view of the handle body looking upwardly into the open lower end thereof;

FIG. 6 is a bottom plan view of the attachment insert body likewise looking up into the low open end thereof;

FIGURE 7 is a bottom plan view of the handle body with the attachment insert disposed therein;

FIGURE 8 is a view similar to FIGURE 2 but showing the manner in which the gripping elements are retained in the actuating means when the device is not attached to a shaft or stem; and FIGURE 9 is a fragmentary bottom plan view of the attachment insert taken upon an enlarge scale and showing in some what exaggerated proportions the abutment or stop means which limits radially inward movement of the gripping elements in their guide slots.

As shown in FIGURE 1 the replacement handle of this invention is illustrated as applied to the valve stem of a conventional faucet, the handle being designated generally by the numeral 10 while the faucet is indicated at 12. It will be appreciated that although the valve stem of a faucet has been chosen for the purpose of disclosing one example of applying the principles of this invention, that the replaceable handle may be applied to various other objects such as shafts or the like in order to afford a means for imparting movement thereto.

Referring to FIGURE 2 it will be more particularly observed that the body of the faucet valve is shown at 14 and has an upwardly extending diametrically reduced stem portion 16 to which it is desired to secure the replacement handle 10.

The replacement handle which forms the subject matter of this invention comprises a number of components which are shown in their disassembled relation in FIGURE 4. These components consist of a generally cylindrical handle body 20 including a cylindrical skirt 22 with a top wall or top surface 24, the handle thus comprising an inverted cup which is open at its bottom end and has a central chamber therein indicated by the numeral 25. Upon the exterior surface of the handle there may be provided radially projecting extensions 26 providing fingergrip means for manipulating the handle. Within its central opening the handle body 20 has upon the underside of its top wall 24 a plurality of inwardly projecting bosses each indicated by the numeral 28 and spaced circumferentially from each other about the cylindrical skirt or wall 22.

A further component of the removable replacement handle consists of an adapter or attachment insert indicated generally by the numeral 30. The latter includes a box-like hollow receptacle 32 having a downwardly opening central cavity 34 therein and includes a top wall 36 as shown in FIGURE 2. The cup-shaped member 32 is preferably substantially square in cross section although obviously other suitable shapes may be provided as desired, and includes depending side walls 38. Projecting inwardly from these side walls are lugs 40 which upon their inward extremities integrally support a cylindrical wall 42 having circumferentially spaced vertically extending notches or openings 44 therein. The cylindrical internal surface of the wall 42 is internally threaded as at 46 to receive therein the externally threaded bushing 48 which constitutes an actuating member as set forth hereinafter. This bushing includes a conical downwardly convergent bore 50 therethrough which constitutes a wedging surface for a purpose to be subsequently apparent.

Interposed between the bushing or actuating means 48 and the shaft or stem 16 which is to be engaged by the handle are a set or plurality of gripping elements each indicated generally by the numeral 52. Any desired number of these elements may be provided, there being four illustrated in the specific arrangement disclosed in these drawings. Each element is of J-shaped configuration consisting of a vertical or stem portion 54, a horizontal portion 56 having at its outer or free end an inturned hook 58. Upon what may be termed the outer face of the gripping elements there is provided a vertically extending knife edge 60 with the front face of the element being beveled therefrom. The beveled front faces of the elements are provided with a plurality of serrations or teeth as at 62 which may be of any desired character and configuration. Upon the rear face of the vertical or stem portion 54, each element is provided with a cam surface 64 which is complementary to and cooperates with that of the conical surface 50 of the actuating means.

The arrangement is such that the set of gripping elements may be each disposed in one of the notches 44 in the depending skirt 42 so that the flat planar top surface 66 of each element may slidingly engage upon the inside surface of the top wall 36 of the attachment insert for radial sliding movement thereon through the slots or notches 44 towards and from the central opening thus provided between these elements at the center of the insert.

The arrangement as so far described is such that upon adjustment of the bushing 48 inwardly of the insert towards the top wall 36 thereof, the cooperating cam surfaces will radially force the gripping elements towards the stem or shaft 16 to be engaged thereby. This will in turn force the knife edges 60 of each gripping element into the stem or shaft with the toothed portion 62 further engaging the shaft. In this manner a firm gripping action is obtained and yet one which is readily releasable, between the gripping elements and the shaft or stem 16.

The inturned hooks 58 on each of the gripping elements are adapted to overlie the upper end of the bushing as will be seen from a comparison of FIGURES 2 and 8. Consequently, the hooks as shown in FIGURE 8 provide a means for seating or retaining the gripping elements in the bushing whereby the latter may be employed to prevent accidental dropping of a gripping element from the attachment insert, thereby assisting in assembling the parts of the device.

When it is desired to position the adapter insert upon a shaft or stem, it is merely necessary to move the gripping elements upwardly along the conical surface of the bushing 48, to spread them apart sufficiently and to enlarge the central opening therebetween to a sufficient extent to accommodate and receive therein the shaft or stem 16. Such a position of the gripping elements is shown in FIGURE 2. It will thus be seen that the gripping elements will automatically compensate for differences in diameters of the various elements to be gripped by the handle thus affording a wide range of sizes of articles to which the handle may be applied.

The attachment insert 30 is received within the handle body 20 in the position shown in FIGURES 3 and 7 with the guide members 28 engaging the sides 38 and preventing relative rotation of the adapter insert within the handle body. It will thus be apparent that the adapter insert can be readily positioned in or removed from the handle body as a unitary subassembly, thereby enabling different sizes of handles and/or adapter inserts to be interchangeably associated with each other as may be desired.

A single fastening means is employed to detachably secure the adapter insert within the handle body and both of these members in place upon the shaft or stem 16. Thus, aligned and registering bores 70 and 72 are formed respectively in the top walls 24 and 36 of the handle body and of the attachment insert to receive therethrough a fastening means such as a screw 73 which is threadedly engaged in the extremity of the stem or shaft 16.

It will be observed that the notches 44 constitute guide means within the attachment insert 30 to retain and guide the gripping elements for radial movement towards and from a central axis of the central opening within the insert.

In some instances, the above described construction may be found to function satisfactorily. It is preferred, however to provide an additional guide means for the gripping elements to ensure and facilitate their rectilinear movement towards the shaft 16 under the thrust of the actuating means 48.

To this end, as will be apparent from a comparison of FIGURES 2, 6, 8 and 9, there are provided radially extending guide channels 74 in the top wall 36 of the insert which extend from the central opening 72 through the notches 44 to the side walls 32. These channels are of sufficient width and depth to snugly receive for guided sliding movement the horizontal portion 56 of the gripping elements 52. There is thus provided a smooth bearing surface on the top wall 36 to receive the gripping element surface 66 and of sufficient length to permit sliding of the gripping element portions 56, 58 through the notches 44. Further, the sides of the guide channels 74 absorb any lateral thrust to which the elements 52 may be subjected thereby increasing the strength, effectiveness and life of the device.

It will be appreciated that the various components of this universally applicable replacement handle may be formed in various sizes and of various suitable materials as desired. Further, the construction is such that the chief source of wear occurs upon the gripping elements which may be readily replaced from time-to-time as may be desired.

The foregoing description sets forth a relatively simplified construction which is entirely satisfactory for many purposes. In some instances, however, it may be found advantageous to provide additional retaining and stop means for the gripping elements. To this end, the retaining ring 80 and the abutment or stop projections 82 are provided.

Referring first to the somewhat exaggerated proportions shown in FIGURE 9 it will be noted that the radially inner ends of the walls of the guide channels 74 have integral, lateral projections 82 which restrict the cross-sectional area of the guide channels to such an extent that they constitute abutment, stop or limit means which prevent sliding passage of the gripping elements 52 out of the inner ends of the guide channels.

Further, a retaining ring 80 is provided to prevent the gripping elements from dropping out of their guide channels 74 when the actuating member 48 is released. The cylindrical intermediate wall 42 is provided upon its peripheral inner surface with circumferentially extending recesses 84, see FIGURE 2, disposed adjacent the top wall 34, in which is releasably seated the resilient split ring 80. This retainer ring overlies the guide channels 74 and the underside of the horizontal portions 66 of the elements 52 slidable therein to prevent the elements from dropping out of the channels when the device is in the position shown in FIGURE 8 and with the actuating member 48 being in an element releasing position.

It will be understood that the dimensions of the gripping elements are such that they may readily shift radially in their guide channels between their radially inward position in which they are retained in gripping engagement with the stem 16 by the wedging action of the actuating member 48 and their radially outward position when the actuating member is released, as in FIGURE 8.

Either of the means 80 or 82 may be used singly or jointly and function to retain the gripping elements in an assembled relation in the guide channels 74 of the attachment insert body 32.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A replacement handle adapted to be applied to one end of an axially elongated stem comprising a handle body having internal torque transmitting surfaces, a replaceable insert having a polygonal peripheral wall complementary to said surfaces and engageable therewith, guide means disposed within said insert in radially aligned relation to a rotational axis of said stem, a plurality of gripping elements movably mounted by said guide means completely enclosed within the insert, threaded means mounted by said insert for radial displacement of said gripping elements into engagement with the stem, said insert including a top wall mounting guide means within the handle body and fastener means passing through said handle body, said insert, and into the stem for holding the top wall of said insert in axially assembled relation to the stem, said fastener means abutting the handle body and means aligning the guide means between the torque transmitting surfaces, whereby torque may be transmitted through the gripping elements to the stem without any substantial twist on the replaceable insert.

2. A replacement handle adapted to be applied to one end of an axially elongated stem comprising a handle body having internal torque transmitting surfaces, a replaceable insert having a polygonal peripheral wall complementary to said surfaces and engageable therewith, guide means mounted within said insert in radially aligned relation to a rotational axis of said stem, a plurality of gripping elements movably mounted by said guide means completely enclosed within the insert, threaded means mounted by said insert for radial displacement of said gripping elements into engagement with the stem, said insert including a top wall mounting the guide means within the handle body and fastener means holding the top wall in axially assembled relation to the stem and abutting the handle body for aligning the guide means between the torque transmitting surfaces, whereby torque may be transmitted through the gripping elements to the stem without any substantial twist on the replaceable insert, and retaining means for preventing axial disassembly of the gripping elements, each of said gripping elements having a hook portion engageable with the retaining means, said threaded means including circumferentially spaced wall sections connected to and radially spaced from the peripheral wall of the insert and a camming member threadedly received by the wall sections and engageable with the gripping elements for displacement thereof, said guide means having grooves extending between and radially beyond said wall sections within which the gripping elements are slidably mounted, said fastener means comprising a screw element secured to the stem and extending through apertures in the handle body and the top wall of the insert aligned along said rotational axis of the stem.

References Cited by the Examiner

UNITED STATES PATENTS

| | | |
|---|---|---|
| 1,989,083 | 1/1935 | Dahnken. |
| 2,013,578 | 9/1935 | Pardieck. |
| 2,023,951 | 12/1935 | Cohan. |
| 2,039,917 | 5/1936 | Michel. |
| 2,047,704 | 7/1936 | Podolsky. |
| 2,141,066 | 12/1938 | Herbst _____ 287—53 X |
| 2,797,941 | 5/1957 | Manning. |
| 3,109,052 | 10/1963 | Dumire et al. _____ 287—114 |

FOREIGN PATENTS

| | | |
|---|---|---|
| 1,183,328 | 1/1959 | France. |
| 12,465 | 5/1912 | Great Britain. |

CARL W. TOMLIN, *Primary Examiner.*

THOMAS F. CALLAGHAN, *Examiner.*